United States Patent [19]

Esch et al.

[11] Patent Number: 5,675,076

[45] Date of Patent: Oct. 7, 1997

[54] DEVICE FOR MEASURING CYLINDER DEFORMATIONS IN PISTON-TYPE INTERNAL-COMBUSTION ENGINES

[75] Inventors: Thomas Esch, Aachen, Germany; Albert Haas, Eynatten, Belgium; Juergen Orgrzewalla, Juelich; Franz Koch, Aachen, both of Germany

[73] Assignee: FEV Motorentechnik GmbH & Co. Kommanditgesellschaft, Aachen, Germany

[21] Appl. No.: 537,829

[22] PCT Filed: Sep. 6, 1994

[86] PCT No.: PCT/EP94/02961

§ 371 Date: Jan. 25, 1996

§ 102(e) Date: Jan. 25, 1996

[87] PCT Pub. No.: WO95/23323

PCT Pub. Date: Aug. 31, 1995

[30] Foreign Application Priority Data

Feb. 25, 1994 [DE] Germany ............ 44 06 132.3

[51] Int. Cl.⁶ .......... G01M 15/00; G01M 13/00; G01B 7/16
[52] U.S. Cl. .......... 73/116; 324/378; 33/605
[58] Field of Search .......... 324/378, 699, 324/701; 73/115, 116, 117.2, 117.3, 118.1; 33/605

[56] References Cited

U.S. PATENT DOCUMENTS 4,672,843  6/1987  Pozniak .................. 73/115

FOREIGN PATENT DOCUMENTS

| 0438360 | 7/1991 | European Pat. Off. |
| 1965892 | 2/1971 | Germany . |
| 63-009811 | 6/1988 | Japan . |
| 3059436 | 5/1991 | Japan . |
| 1226029 | 4/1986 | U.S.S.R. |
| 1441183 | 11/1988 | U.S.S.R. |

OTHER PUBLICATIONS

F. Stecher: "Zylinderverformungen–Untersuchungen in einer Modellanlage und im laufenden Motor". In: MTZ Motortechnische Zeitschrift, vol. 31, No. 12, 1970, Stuttgart, Germany, pp. 505–511.

*Primary Examiner*—George M. Dombroske
*Attorney, Agent, or Firm*—Spencer & Frank

[57] ABSTRACT

A piston-type internal combustion engine includes an engine cylinder; a piston slidably received in the engine cylinder; and a device, carried by the piston, for measuring deformations in the cylinder wall. The piston has at least two radial bores. The measuring device includes a separate carrier element disposed in each radial bore. The carrier elements are attached to the piston in a region of the piston axis such as to be displaceable relative to the radial bores, whereby a relative motion between the piston and each carrier element is provided upon radial expansion and contraction of the piston. The measuring device further includes a separate, electrically inductive path sensor, which is electrically connectable to a measuring and evaluating device, and which is attached to a respective carrier element such that the path sensor remains out of contact with the cylinder wall at all times during movement of the piston relative to the engine cylinder. The radial position of each path sensor is, by virtue of the floatingly attached carrier elements, independent from radial expansions and contractions of the piston.

17 Claims, 3 Drawing Sheets

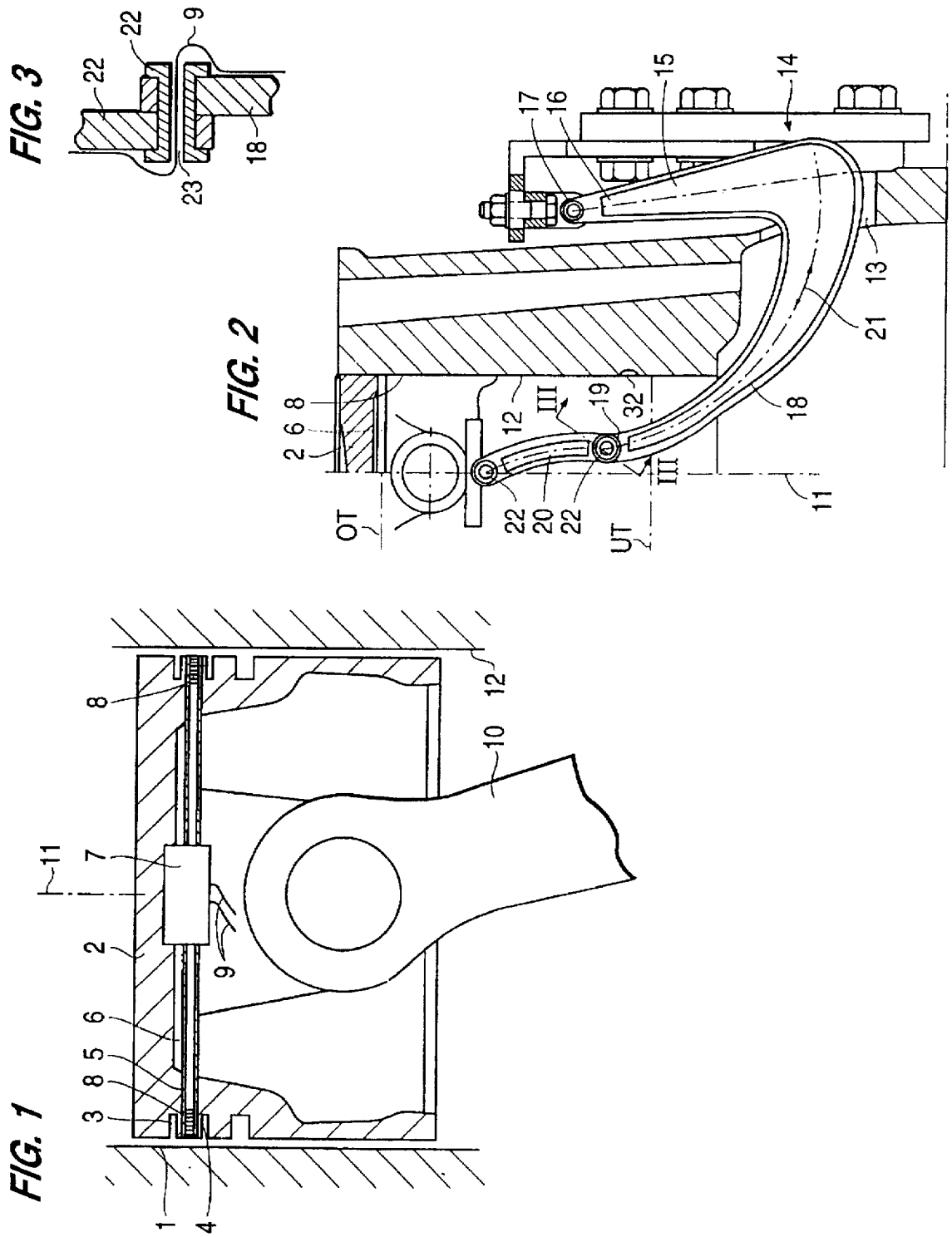

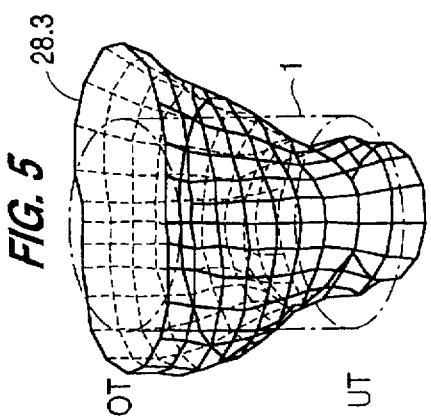
FIG. 5
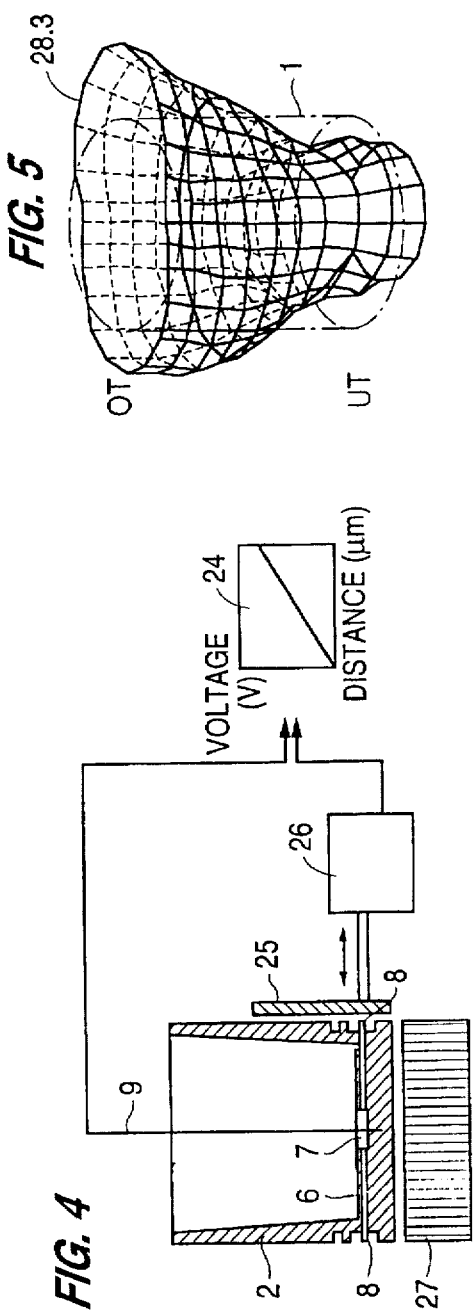
FIG. 4
FIG. 6
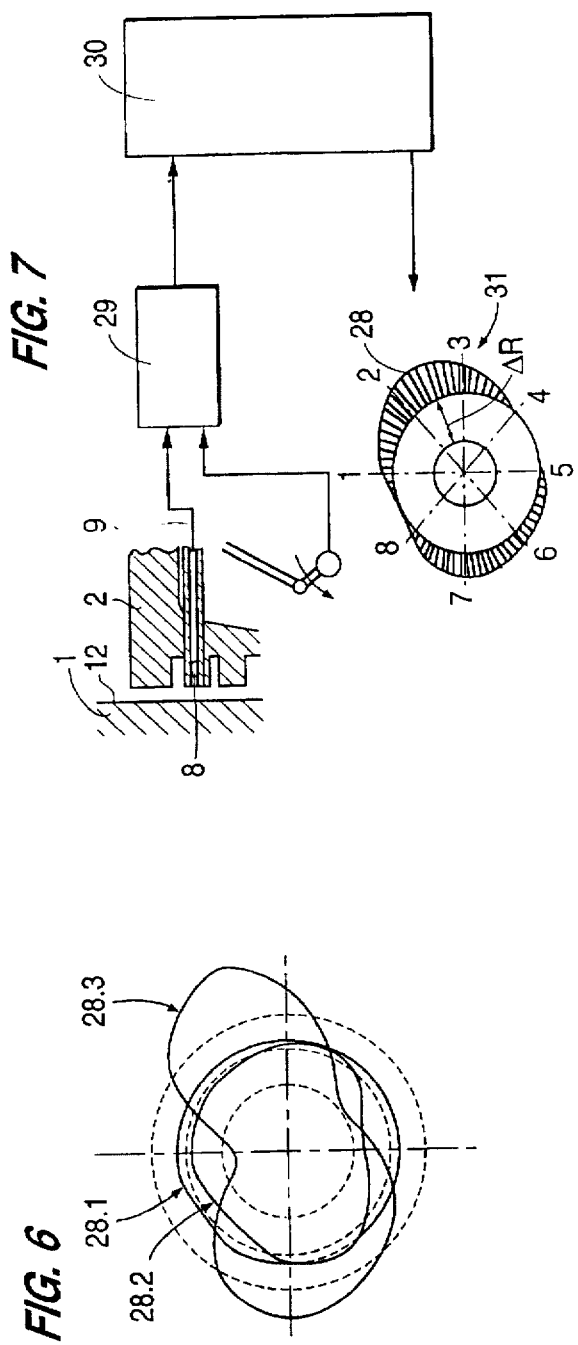
FIG. 7

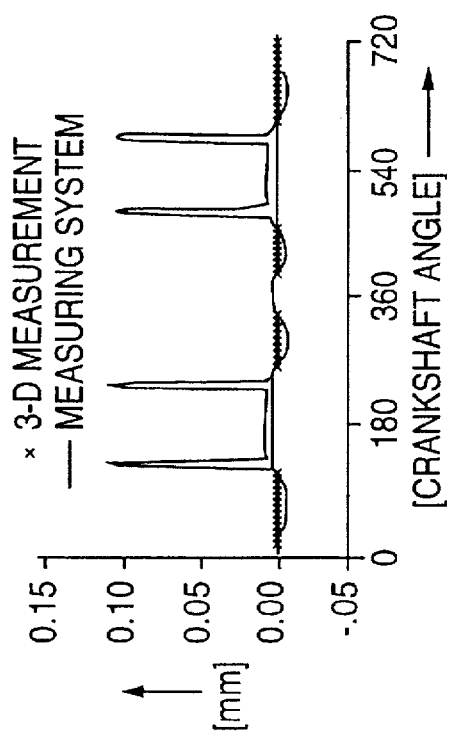
FIG. 9.1
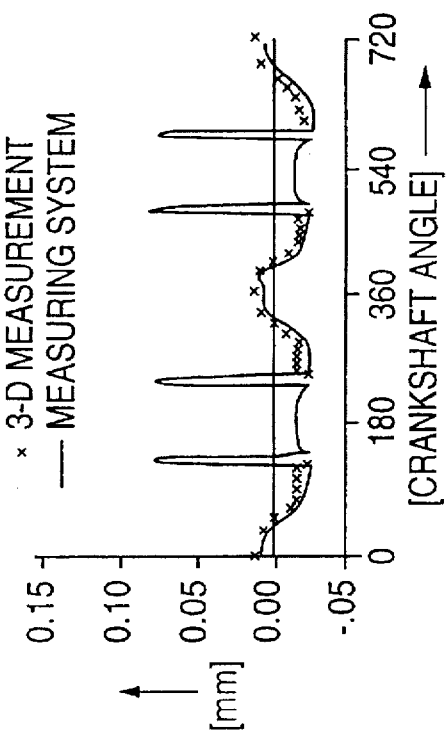
FIG. 9.2
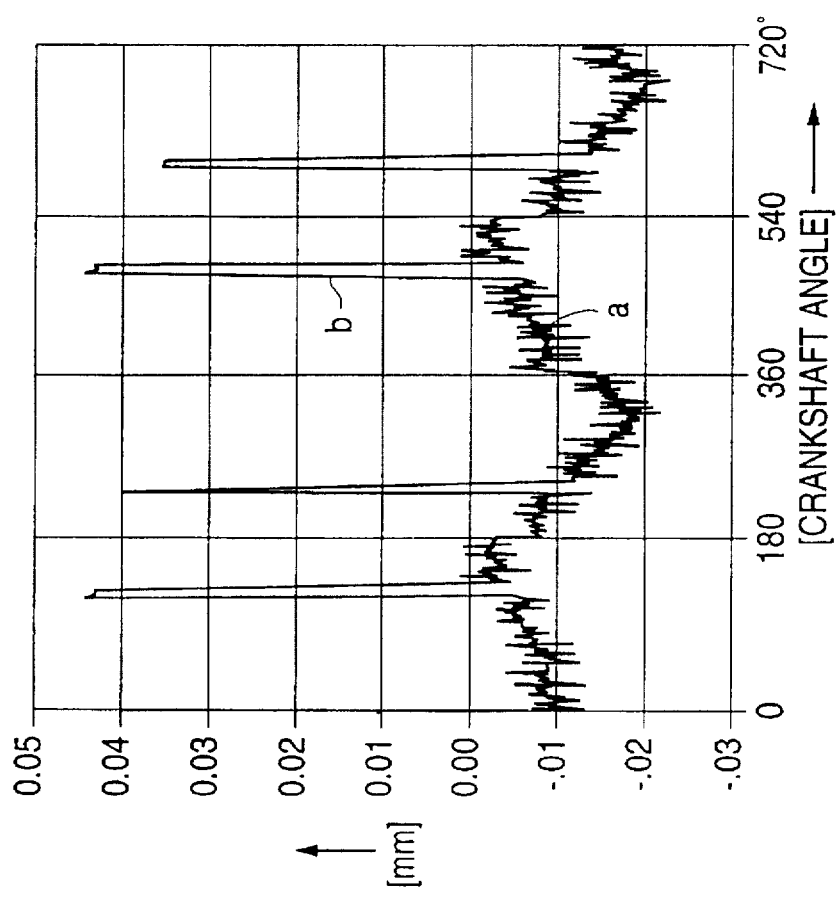
FIG. 8

DEVICE FOR MEASURING CYLINDER DEFORMATIONS IN PISTON-TYPE INTERNAL-COMBUSTION ENGINES

BACKGROUND OF THE INVENTION

For the operation and service life of the frictional system consisting of a piston/piston rings/cylinder sleeve assembly, a circular cylinder tube is ideal. Apart from manufacturing inaccuracies, particularly thermal and mechanical stresses which affect the cylinder tube lead to deviations of the cylinder tube from its ideal geometry. The mechanical stresses are derived from clamping forces generated due to the mounting of the cylinder head and cylinder head gaskets. The thermal stresses are generated by the different heat expansion of interconnected engine components, particularly the crank case and the cylinder head, by temperature gradients during operation as well as by the gas pressure during operation. Because of these deformations which represent a departure from the ideal geometry of the cylinder tube, the oil consumption, the blow-through and wear behavior and, because of the increased friction, also the fuel consumption are affected.

In the initial development of an engine it is sought to largely eliminate these different influencing factors by structural measures, in order to be able to maintain, to the extent possible, the ideal geometry of the cylinder tube even during operation.

It has been attempted to detect cylinder deformations of this type. Relevant publications in this connection are as follows:

K. Lönne: *The Cylinder Deformation Measuring System According to Goetze and Possibilities for Reducing the Cylinder Deformations* (original title: Das Goetze Zylinderverzugsmeβsystem und Möglichkeiten zur Reduzierung der Zylinderverzüge); Technical Bulletin D11, published by Goetze AG, Burscheid, Germany;

P. Jöhren: *Device for Determining Cylinder Deformations and Their Causes* (original title: Einrichtung zur Ermittlung yon Zylinderverzügen und Ihren Ursachen); Technical Bulletin K11, published by Goetze AG, Burscheid, Germany; and F. Stecher: *Cylinder Deformations—Tests in a Model Construction and in a Running Engine* (original title: Zylinderverformungen—Untersuchungen in einer Modellanlage und im laufenden Motor); MTZ Motortechnische Zeitschrift, Volume 31, No. 12, 1970, Suttgart, Germany.

Thus, for example, in the publications by K. Lönne and P. Jöhren a process is described in which measurements of cylinder deformations were performed statically, so that only structure-caused stress conditions could be simulated. The effects by engine operation are missing, so that the stress conditions resulting therefrom cannot be detected at all, since differences in the component temperatures caused by the combustion process and additional mechanical stresses caused by gas forces during engine operation cannot be detected.

In the publication by Stecher a process is described which, to be sure, permits measuring during operation, but only at low rpm's. Further, the measuring process is not contactless, so that significant interfering effects may occur.

SUMMARY OF THE INVENTION

It is thus the object of the invention to provide a device for measuring the cylinder deformation in piston-type internal-combustion engines which makes it possible to detect cylinder deformations under static stress as well as under operational stress, that is, while the engine is running.

This object and others to become apparent as the specification progresses, are accomplished by the invention, according to which briefly stated, the piston-type internal combustion engine includes an engine cylinder; a piston slidably received in the engine cylinder; and a device, carried by the piston, for measuring deformations in the cylinder wall. The piston has at least two radial bores. The measuring device includes a separate carrier element disposed in each radial bore. The carrier elements are attached to the piston in a region of the piston axis such as to be displaceable relative to the radial bores, whereby a relative motion between the piston and each carrier element is provided upon radial expansion and contraction of the piston. The measuring device further includes a separate, electrically inductive path sensor, which is electrically connectable to a measuring and evaluating device, and which is attached to a respective carrier element such that the path sensor remains out of contact with the cylinder wall at all times during movement of the piston relative to the engine cylinder. The radial position of each path sensor is, by virtue of the floatingly attached carrier elements, independent from radial expansions and contractions of the piston. The device according to the invention offers the possibility of measuring the cylinder geometry not only in a static process, but, above all, also during engine run. Since the deformations of the cylinder tube decisively affect the sealing conditions of the piston rings, the inventive arrangement of the path sensors which detect the distance to the adjoining cylinder wall in a contactless manner, offers the advantage that the deformations are measured precisely in this region. It is a further advantage of the invention that no special pistons need to be used; rather, mass-manufactured pistons may find application, in which merely the corresponding radial bores have to be provided and then the carrier elements have to be inserted. This provides for the possibility to "scan" the cylinder contour in a contactless manner during stroke motion of the piston directly in the respective engagement region of the piston rings. By using inductive path sensors it is furthermore possible to separately detect the signal emitted by each path sensor, so that corresponding to the number of the utilized path sensors, a corresponding number of measuring signals is simultaneously also available in the measuring and evaluating unit and thus a direct "image" of the cylinder contour may be obtained. Since the path sensors, together with their carrier elements, are movable relative to the piston in the piston bores, that is, they are floatingly supported, the piston deformations themselves, such as heat expansions of the piston or mechanical deformations caused by the effect of gas pressure, do not influence the position of the path sensors—related to the central piston axis—so that only the behavior of heat expansion of the carrier elements has to be taken into account for the signal processing.

In order to maintain falsifications of the measuring signal by heat expansions of the carrier element as slight as possible, a preferred embodiment of the invention provides that the carrier elements are made of a material having a very low coefficient of heat expansion. For this purpose advantageously a metal alloy known under the designation Invar is used, whose coefficient of heat expansion $\alpha$ is between $-0.5$ and $+2 \times 10^{-6} \text{grd}^{-1}$. Expediently, a material is used which has a coefficient of heat expansion of approximately $1 \times 10^{-6} \text{grd C}$.

Since the measuring signals of the individual path sensors can be simultaneously detected and taken out, it is of particular advantage to arrange on the piston in each instance two path sensors diametrically in an outward orientation. By virtue of such a paired diametrical arrangement it is possible to always perform a detection of the cylinder contour along a diameter. It is expedient to provide eight path sensors which in each instance are arranged diametrically and are offset at 45° to one another, so that for the evaluation of the measuring signals with the aid of Fourier series, deviations from the ideal circular shape may be determined. At the same time, a description of the cylinder deformation is possible with the aid of Fourier coefficients. Since for calculating the Fourier order, in each instance twice the number of measuring points on the circumference is required as compared to the number of orders are to be calculated, an arrangement of eight sensors makes possible the calculation up to the fourth Fourier order. From this it follows that in conjunction with the central attachment of the path sensors to the piston with their carrier elements, not only the cylinder deformation may be continuously detected corresponding to the stroke motion, but at the same time, the evaluation of the measuring results may also take into account the transverse motion of the piston by means of a corresponding computer program. By means of such a computer program the eccentricity of the piston center, which, at the same time, is also the measuring center, may be determined by reference circle generation related to a fixed coordinate system. The course of the eccentricity represents here the transverse piston motion.

With the aid of such a measuring device it is possible to proceed step-by-step in the development of internal-combustion engines having low-deformation cylinder tubes, and, as compared to conventional technology, the number of development steps may be significantly reduced. First a computer simulation of the stresses and the cylinder tube deformation is effected by means of corresponding computer-supported construction programs (CAE) as well as investigations of the found construction according to the method of finite elements (FEM). The temperature distribution and the deformations are measured here by means of FEM. The boundary conditions required for the FEM computations, such as the heat flows and heat transitions are determined by means of special simulation programs. The informativeness of the absolute results of these computations is, however, limited, since assumptions and simplifications have to be made. In a successive step, during engine run the cylinder tube deformation is measured on a prototype with the measuring device according to the invention and the actual cylinder tube deformations under the influence of mechanical and thermal stresses are determined.

For determining cylinder deformations during engine run, according to a feature of the invention the piston provided with path sensors is coupled with the engine crankshaft by means of a connecting rod and the signal conductors of the individual path sensors are brought out of the engine by means of a transfer element connected with the piston. By appropriately designing the transfer element and by taking into account the dynamic stresses during operation, it is thus feasible to perform these measurements also in the nominal rpm range of the engine to be tested.

With the aid of the thus-obtained measuring results, the computer models of the CAE and FEM programs are calibrated by comparing computation and measurement. The revised construction may then be again verified with the device according to the invention by methods of measuring technology. In this manner it is possible to achieve a reduction of cylinder deformations by structural measures and to approximate the ideal condition of a circularly round cylinder tube and thus to achieve a significant optimization of the shape of the piston rings and the piston. Since then the piston rings have a better sealing behavior at the low-deformation cylinder tube, a reduction in the oil consumption and blow-through results. A reduction of the piston ring bias is also possible, whereby the friction of the structural element "piston" is reduced in the cylinder and thus the fuel consumption of the engine may be lowered.

According to an expedient feature of the invention the carrier elements are tubular and accommodate the signal conductors of the respective path sensor. It is expedient in this connection to attach the carrier elements to the piston by means of a central securing element. By virtue of this arrangement the signal conductors may be brought together in a protected manner from the individual path sensors up to the region of the securing element.

According to a particularly advantageous feature of the invention the transfer element is formed by a rocker which is supported laterally externally of the engine block for pivotal motion about an axis oriented transversely to the cylinder axis and which, with its free end, is articulated to the piston. With the aid of a transfer element structured in this manner it is possible to carry outwardly the signal conductors held together in the piston center above the wrist pin. The rocker extends into the crankcase through an opening, maintained at a possibly small size, into a space below the cylinder, and the pivotal plane of the rocker is oriented parallel to the plane of motion of the associated connecting rod. The signal conductors are mounted on the rocker and are thus brought outwardly reliably and in a protected manner.

According to a particularly expedient feature of the invention the free end of the rocker is articulated to the piston by means of an intermediate link. This arrangement is advantageous in that the influence of transverse forces on the piston, derived from the motion of the rocker, are largely eliminated.

According to a particularly advantageous feature of the invention the rocker is of approximately V shape, and the stationary articulation of one end of the rocker on the housing and the articulation of the free end of the rocker on the piston are approximately at the same height when the piston is in its upper dead center position. According to a preferred feature the rocker arm which extends into the engine space and which constitutes the free end of the rocker is arcuate, preferably circularly arcuate. In case of a circularly arcuate configuration the center of the arc preferably lies on the pivot axis of the stationary articulation of the rocker at the housing. Such a design of the transfer element offers the possibility of a very small spatial requirement in the engine block because of its particular, V-shaped configuration. Coupled with an appropriate design, it is a result of this arrangement that apart from a very small passage opening in the engine block only slight changes, if any at all, have to made in the crankshaft and the connecting rod. Also, the transfer element may be designed to have the required strength, so that measurements up to the nominal rpm range of the engine to be tested are feasible. Particularly the circularly arcuate configuration of the rocker arm which extends into the engine space permits a dimensioning of the rocker passage opening such that a modification of the system does not interfere with the measuring result. In particular it is feasible to design the passage opening so narrow that no stiffening ribs need to be cut or removed.

According to another advantageous feature of the invention the signal conductors of the path sensors are affixed to the rocker and/or the intermediate link and are, at each articulation, guided from one part to the other through axial bores of the joints. By guiding the signal conductors through corresponding axial bores provided in the respective pivot pin, the angular changes affecting the signal conductors may be maintained at the smallest possible value. The signal conductors are exposed only to torsional stresses and are not exposed to any bending stresses. By virtue of this arrangement a rupture of the signal cable due to continuously alternating bending stresses may be substantially avoided.

According to another feature of the invention, in the running face of the cylinder, at a distance above the lower dead center of the path sensors, calibrating grooves of predetermined depth associated with the respective path sensors are provided in an orientation aligned with the cylinder axis. Upon piston movement, the calibrating grooves are swept over by the respective path sensor. The provision of such calibrating grooves makes possible a monitoring of the entire measuring device and, if required, a re-calibration of the path sensors during operation. Since these calibrating grooves are arranged in the lower region of the cylinder tube to be tested, that is, in a region which is less exposed to deformations than the particularly critical region in the vicinity of the cylinder head, for each piston stroke a reliable monitoring is effected, from which it may be determined whether the initial calibration of the path sensors is still present.

Thus, the measuring device according to the invention may be used for both static deformation measurements and—what is of preference here—deformation measurements under operating conditions, so that a universal application possibility is provided.

BRIEF DESCRIPTION OF THE DRAWINGS

FIG. 1 shows a vertical section through a cylinder tube with piston,

FIG. 2 shows the connection of the piston with a transfer element,

FIG. 3 shows a section along line III—III in FIG. 2 on an enlarged scale,

FIG. 4 shows the calibration in the form of a block diagram,

FIG. 5 shows, significantly enlarged, a cylinder running face deformed under operational conditions, FIG. 6 shows deformation contours of the cylinder running face in the upper dead center in different operational conditions, FIG. 7 shows the course of the measuring and evaluating process in a block diagram, FIG. 8 shows a signal record, FIG. 9.1 shows a cold-static measurement of cylinder head deformation with a 3-D measuring machine compared to a measuring device according to the invention, FIG. 9.2 shows a comparison of a hot-static measurement of cylinder head deformation.

DESCRIPTION OF THE PREFERRED EMBODIMENT

The sectional illustration of FIG. 1 shows a vertical section taken through a cylinder tube 1 of a piston-type internal-combustion engine to be tested. In the piston-type internal-combustion engine to be tested the provided massmanufactured pistons 2 are used, as may be seen in the drawing. Thus, in the piston 2, in the region between the first and the second piston ring which are indicated only by the corresponding receiving grooves 3 and 4, diametrically opposite radial bores 5 are provided. In the embodiment presently described, a total of eight such bores are provided which, in each instance, are oriented at 45° to one another. Tubular carrier elements 6 are inserted into the bores 5 with a slight play and are firmly mounted on the underside of the piston bottom by means of a central securing element 7 which is central relative to piston axis 11 as shown in FIG. 1. At the outer end of each carrier element 6 an electrically inductive path sensor 8 is inserted which has a measuring range of about 500 μm with a non-linearity of about 0.2%. For measurements during operation, that is, under the effect of temperature, with such path sensors measurements with a reproducibility of under 3 μm may be achieved. The signal conductors 9 of the individual path sensors 8 are brought together by the associated tubular carrier elements up to the central securing element 7 and are carried to the outside through a corresponding outlet opening. The piston 2 is conventionally coupled with the crankshaft by a connecting rod 10. As noted before, an altogether operational engine is involved.

For the purpose of avoiding transverse effects from the piston deformation, the carrier elements 6 as well as the central securing element 7 are made of a material having a very low coefficient of heat expansion, so that the predetermined distance from the piston axis 11 to the measuring tip of the path sensors 8 is independent from the momentary temperature and is practically constant. Since the carrier elements 6 are loosely or floatingly guided in the bores 5, the piston may freely expand in the radial direction. As a material for the carrier elements 6 and the central securing element 7 a so-called Invar alloy may be considered which has a coefficient of thermal expansion α of, for example, $1 \times 10^{-6} \text{grd}^{-1}$.

As it may be understood from the preceding discussion pertaining to FIG. 1, in such a construction a plurality of path sensors may be installed also in a mass-manufactured piston. Since several path sensors 8 are uniformly distributed along the circumference, upon upward and downward motion of the piston for each piston position the distance between the respective path sensor 8 and the cylinder wall 12 may be detected, so that corresponding to the number of the path sensors, a corresponding number of measuring signals are obtained which, when combined and evaluated by methods of measuring technology, yield an indication concerning the circumferential contour of the cylinder tube 1 for the respective measuring plane. Since the tests concern an operable engine, the contour of the cylinder wall 12 may be determined as a function of the position of the crankshaft or may be related to the upper and lower dead center.

FIG. 2 shows a schematic vertical section taken through a cylinder of a piston-type internal-combustion engine; the piston 2 is illustrated in its upper dead center position. The connecting rod has been omitted for the sake of clarity of illustration. The schematically illustrated part of an engine block has underneath the cylinder zone a throughgoing opening 13 through which a transfer element 14 passes. The signal conductors 9 are secured to, and are brought out of the engine from, the transfer element 14. The transfer element 14 is essentially formed of an approximately V-shaped rocker 15 which, at the end of one of its rocker arms 16, is articulated laterally to the outer side of the engine block by means of a support 17 affixed to the housing. The other rocker arm 18 is arcuate, preferably circularly arcuate, and the center of the circular arc determining the contour lies in the support 17. The rocker 15 is, with its free end 19 articulated to the piston 2 by an intermediate link 20. By virtue of this arrangement the rocker 15 may pivot back-and-forth in the direction of the arrow 21 about the support 17 affixed to the housing during upward and downward motions of the piston. By means of the coupling via the intermediate link 20, the forces which result from this motion and which are transverse to the direction of motion of the piston 2 may be substantially isolated from the piston motion.

As it has been noted before, the signal conductors 9 of the individual path sensors 8 are guided outwardly of the central securing element 7 at the piston 2 and gathered to form a cable. This signal cable is secured to the intermediate link 20 and the rocker 15 and thus may be brought out of the engine to the region of the support 17 affixed to the housing and then connected with the evaluating device. To avoid bending stresses of the signal cable to a substantial extent, the transition from the piston 2 to the intermediate link 20, from the intermediate link 20 to the rocker 15 and from the rocker 15 to the rocker support 17 is, as shown in the sectional illustration of FIG. 3, so designed that each pivot pin 22 of the respective supporting and articulating points is provided with an axial bore 23 through which the signal conductors 9 are guided over from one element to the other. In FIG. 3 the region of the articulation of the intermediate link 20 at the rocker arm 18 is shown. By virtue of this arrangement the signal conductors 9, despite the relatively large pivotal angle of the joint 19 and the joint 17, are in this zone practically not exposed to bending, but only to torsion. By an appropriately loose twist in this region, the torsional stress may be reduced.

As may be seen in FIGS. 1 and 2, with such a conception the deformation of a cylinder can be measured statically and in the cold condition as before, because by virtue of an appropriate turning of the crankshaft each desired position of the piston in the cylinder may be set. It is also feasible to perform static measurements in the hot condition. Since only slight modifications need to be effected at the piston and the engine block, the possibility is also provided to perform such deformation measurements during engine run. The use of only slightly refitted, mass-manufactured pistons on the one hand, and the slight modifications at the engine block, on the other hand, which has to be provided only with a narrow throughgoing passage 13, it is possible to perform these measurements in the so-called fired engine run, up to the range of the predetermined nominal rpm's of the engine. The conception of the transfer element described above in connection with FIG. 2, permits a construction which has no effects on the deformation, as concerns strength on the one hand, and the moments of inertia on the other hand.

As regards the quality of the measuring results, it is of significance that the inductive path sensors can be calibrated after their installation in the piston. This is effected with the aid of a calibrating device, as shown schematically in FIG. 4. After installing the path sensors 8 with their carrier elements 6, and the securement of the signal conductors 9 at the piston 2 by means of the central securing element 7, the signal conductors 9 are first switched to a measuring device 24. The piston 2 is, in this arrangement, immobilized such that it stands on the piston bottom, and a simulating "cylinder wall 25" is consecutively moved past each path sensor 8 with the aid of an electromechanical path measuring device 26. The actual distance values measured by the path measuring device 26 are compared with the values sensed in a contactless manner by the path sensors, so that for each path sensor a corresponding calibration curve may be obtained. For the examination of the influence of temperature, the piston 2 may be heated to the operational piston temperature with the aid of a heating device 27, so that it is also feasible to calibrate the path sensors for temperatures prevailing in the fired engine run.

FIG. 5 shows, in substantial magnification, an illustration of a cylinder tube deformation at full engine load, obtained by measurement. The engine tested here has wet cylinders made of gray cast, whose light-metal cylinder head distorts the cylinder in the upper region in the longitudinal direction of the engine, which is characteristic of engine structures of this type. The ideal, non-distorted cylinder contour is shown in dash-dot lines.

FIG. 6 shows, also in magnification, different deformation curves for different load conditions for the cylinder wall when the piston is in the upper dead center. The curve 28.1 shows the deformation of the cylinder tube in the cold condition caused during manufacture. The curve 28.2 shows a deformation which appears when the engine idles. The curve 28.3 shows the deformation appearing at full load, as it may also be gleaned from the illustration in FIG. 5. From this illustration the significance and possibilities of the measuring device described in conjunction with FIGS. 1 and 2 may also be recognized. While the deformation curve 28.2 in the idling condition can still be considered as being of approximately "circular shape", the deformation curve 28.3 illustrates the kind of significant disadvantages that appear in this engine construction during operation, so that with a view towards optimization it is compelling to alter the structure so that such a deformation does not occur.

FIG. 7 schematically shows the measuring device in block diagram form. The signals representing the distance between the path sensors 8 and the cylinder wall 12 and detected by the individual path sensors 8 in the piston 2 are, as described in connection with FIG. 2, carried out of the engine by means of the gathered signal conductors 9 and amplified to the desired extent in an amplifier 29. At the same time, an angle sensor detects the momentary crankshaft position, so that the measuring signal of each path sensor 8 is detected as a function of the crankshaft position. The amplified signals are evaluated and processed in an evaluating and computing unit 30, so that by using an appropriately equipped computer, the deformation contour 28 of each measuring plane may be outputted, as illustrated in FIG. 7, as a "measuring result" 31 related to a reference circle.

The individual path sensors were calibrated in a manner described in connection with FIG. 4. before the installation of the respective piston into the engine. To make possible a monitoring during engine run as to what extent does the calibration remain stable or change under the effect of operational influences, in the cylinder wall 12, in the region of the lower dead center, for each path sensor 8 a calibrating groove 32 is provided as shown in FIG. 2. In the direction of the cylinder axis, the calibrating groove has a length of about 6 mm and has a predeterminable depth of, for example, 0.05 mm. If now the associated path sensor sweeps over the calibrating groove, in each instance signal jumps are generated, by means of which it may be monitored, whether the initial calibration of the path sensors has changed during operation.

FIG. 8 shows a signal representation for a path sensor through a crankshaft angle of 720°. The measuring curve region a indicates the signal changes effected by the cylinder deformation. The signal jump b indicates the signal which the sensor transmits as it sweeps over its calibration groove. The signal jump b is proportional to the groove depth. Since the groove depth is known, one can interpret whether the calibration of the individual path sensors has changed during operation so that, if needed, re-calibration may be effected.

FIGS. 9.1 and 9.2 show measuring diagrams to be compared in superposition. In FIG. 9 [sic] an untightened, cold cylinder tube was statically measured. The measuring curve designated at x shows the measuring result obtained with a 3-D measuring device. The curve shown in full lines indicates the course of the diameter change as a function of the crankshaft angle as obtained with the measuring device according to FIG. 2. FIG. 9.2 shows the comparative measuring result for a cylinder deformation for a cylinder statically tightened in a hot state. The calibrating signals b are clearly recognizable.

It will be understood that the above description of the present invention is susceptible to various modifications, changes and adaptations, and the same are intended to be comprehended within the meaning and range of equivalents of the appended claims.

We claim:

1. In a piston-type internal combustion engine including an engine cylinder having a cylinder wall;

a piston slidably received in said engine cylinder; said piston having a piston axis; and a device for measuring deformations in said cylinder wall; said device being carried by said piston;

the improvement comprising (a) at least two radial bores provided in said piston;

(b) a separate carrier element disposed in each said radial bore;

(c) securing means for attaching the carrier elements to said piston in a region of said piston axis to floatingly hold said carrier elements in respective said radial bores, whereby a relative motion between said piston and each said carrier element is provided upon radial expansion and contraction of said piston; and (d) a separate, electrically inductive path sensor electrically connectable to a measuring and evaluating device and being attached to a respective said carrier element such that said path sensor remains out of contact with said cylinder wall at all times during movement of said piston relative to said engine cylinder; a radial position of each said path sensor being independent from radial expansions and contractions of said piston; said carrier elements and the path sensors forming part of said device.

2. The internal-combustion engine as defined in claim 1, wherein each said bore terminates in an opening on a piston surface in an upper region of said piston.

3. The internal-combustion engine as defined in claim 2, further comprising two piston rings carried by said piston; said openings being located between said piston rings.

4. The internal-combustion engine as defined in claim 3, wherein said piston has a bottom defining a plane, said openings lying in said plane.

5. The internal-combustion engine as defined in claim 1, further comprising (e) an engine crankshaft;

(f) a connecting rod coupling said piston with said crankshaft;

(g) signal conductors extending from each said path sensor; and (h) a transfer element for guiding said signal conductors from said piston out of the engine.

6. The internal-combustion engine as defined in claim 5, further comprising an engine block housing said cylinder, said piston, said connecting rod and said crankshaft; further wherein said transfer element includes (a) a rocker having a free end;

(b) a first articulation supporting said rocker externally of and on said engine block for pivotal motion about an axis oriented transversely to said piston axis; and (c) a second articulation supporting said free end of said rocker on said piston.

7. The internal-combustion engine as defined in claim 6, further comprising an intermediate link for connecting said free end of said rocker to said second articulation.

8. The internal-combustion engine as defined in claim 7, further comprising a third articulation for coupling said free end of said rocker to said intermediate link; said third-articulation having an axial bore through which said signal conductors pass from said intermediate link to said rocker.

9. The internal-combustion engine as defined in claim 6, wherein said rocker has a portion extending into said engine block; said portion of said rocker having an arcuate shape.

10. The internal-combustion engine as defined in claim 9, wherein said portion of said rocker has a shape of a circular arc, whose center lies on an axis of rotation of said first articulation.

11. The internal-combustion engine as defined in claim 6, wherein said rocker is of approximately V-shaped configuration; and further wherein said first and second articulations are situated approximately at a same height level when said pistol is in an upper dead center position.

12. The internal-combustion engine as defined in claim 1, wherein said two sensors are situated at diametrically opposite locations of said piston.

13. The internal-combustion engine as defined in claim 1, further comprising signal conductors extending from said path sensors; said carrier elements being tubular and accommodating said signal conductors.

14. The internal-combustion engine as defined in claim 1, wherein said carrier elements have a coefficient of heat expansion $\alpha$ between $-0.5$ and $+2\times10^{-6} grd^{-1}$.

15. The internal-combustion engine as defined in claim 1, further comprising a plurality of calibrating grooves provided in said cylinder wall at locations above said path sensors when said piston is in a lower dead center position; each said calibrating groove having a length oriented parallel to said piston axis and a predetermined depth; each said calibrating groove being swept over by a respective said path sensor during piston motion.

16. The internal-combustion engine as defined in claim 1, further comprising a securing element disposed centrally relative to the piston axis; said carrier elements being attached to said securing element.

17. The internal-combustion engine as defined in claim 16, wherein said central element has a coefficient of heat expansion $\alpha$ between $-0.5$ and $+2\times10^{-6} grd^{-1}$.

\* \* \* \* \*